Sept. 9, 1924.  
J. F. O'CONNOR  
FRICTION SHOCK ABSORBING MECHANISM  
Filed Nov. 10, 1923  
1,508,120
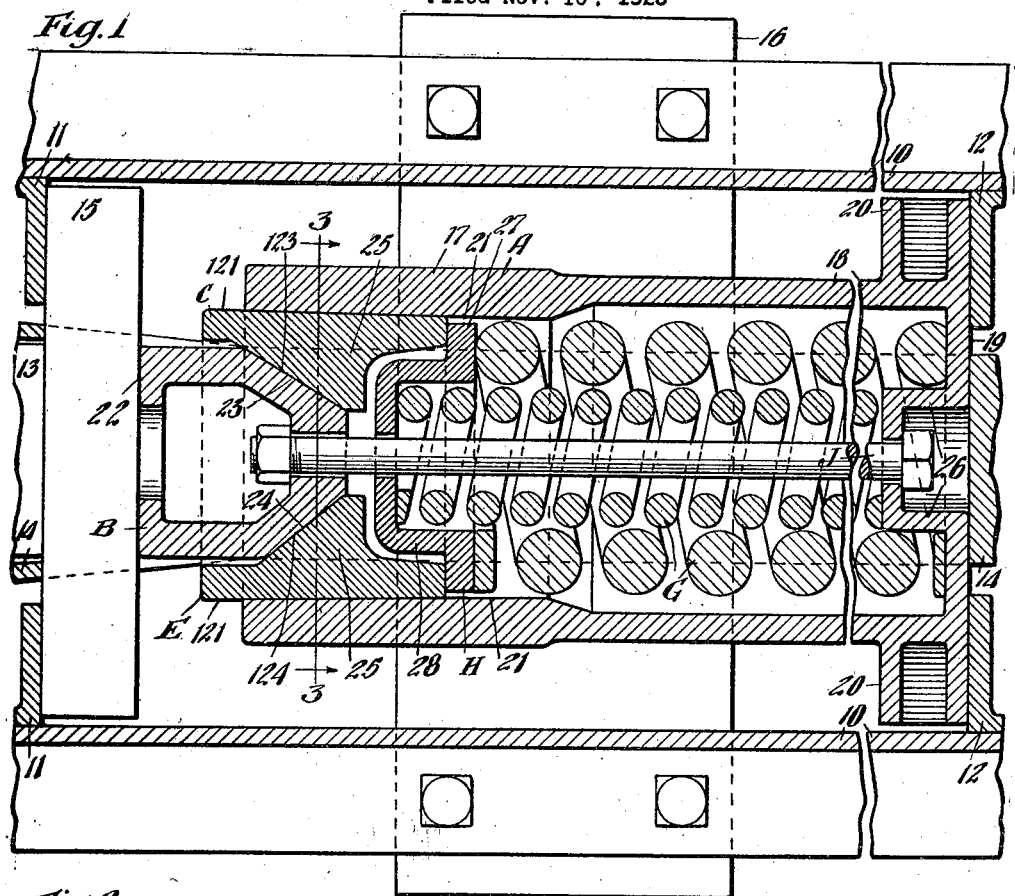
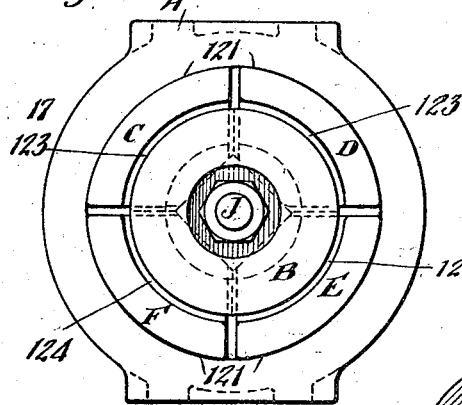
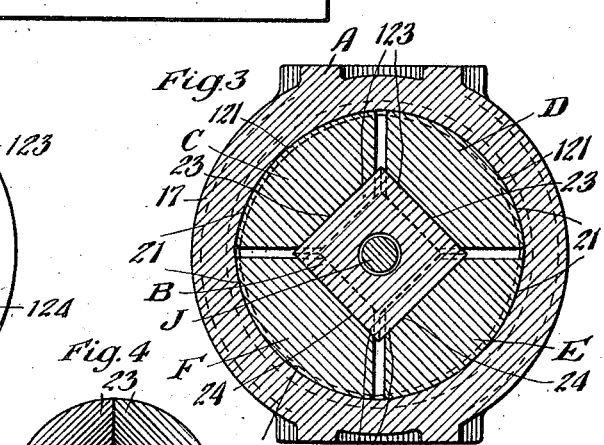
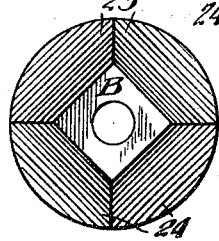
Witnesses  
Wm. Geiger
Inventor  
John F. O'Connor  
By George J. Haight  
His Atty.

Patented Sept. 9, 1924.

1,508,120

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 10, 1923. Serial No. 673,875.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism capable of use wherever heavy shocks are to be cushioned including railway draft riggings, and wherein a system of wedge and friction elements having the attributes of a keen angle system during compression of the mechanism, and the attributes of a blunt releasing angle wedge system during release, is made use of to obtain high frictional capacity and certain release, the wedge and friction elements of the system being arranged in such a manner as to insure balanced pressure between the parts.

Another object of the invention is to provide a mechanism of the character indicated, wherein are employed a friction shell proper of substantially cylindrical form, and a blunt and keen angled wedge friction shoe system cooperable with the shell, with the blunt and keen angle shoes arranged in a circular series and in such a manner as to insure the pressure being equally distributed throughout the circumference of the shell.

More specifically the object of the invention is to provide a mechanism of the character indicated wherein are employed a pressure transmitting wedge and a plurality of wedge friction shoes cooperable therewith with certain of the engaging faces of the wedge and shoes differing in angle from each other and arranged in such a manner that each set of engaging wedge faces is directly opposed to a set differing in angle therefrom, so as to insure a balanced distribution of the expanding forces around the friction shell.

Other objects and advantages of the invention will more clearly appear from the description and claims hereinafter following.

In the drawing forming a part of this specification. Figure 1 is a longitudinal, sectional view of a portion of a railway draft rigging, the section through the shell and friction elements therewithin corresponding to a plane passing through the longitudinal axis of the mechanism and centrally through two opposed friction shoes. Figure 2 is a front end elevational view of the shock absorbing mechanism proper. Figure 3 is a vertical, transverse, sectional view corresponding to the line 3—3 of Figure 1. And Figure 4 is an end elevational view of the pressure transmitting wedge looking toward the inner end of the same.

In said drawing, 10—10 indicate the usual channel shaped center or draft sills of a car under-frame, to the inner faces of which are secured front stop lugs 11—11 and rear stop lugs 12—12, of usual construction. A portion of the drawbar is indicated at 13, the same having operatively associated therewith a hooded yoke 14 of well known form, and within which is disposed the shock absorbing mechanism proper, hereinafter described, and a main front follower 15. The yoke and the parts contained therein are supported in operative position by a detachable saddle plate 16.

The improved shock absorbing mechanism proper, as shown, comprises, broadly, a combined friction shell and spring cage casting A; a pressure transmitting wedge B, four friction shoes C, D, E and F; a spring resistance G; a spring follower or cap H; and a retainer bolt J.

The casting A is of generally cylindrical form, having the friction shell proper 17 thereof formed at the front end. Rearwardly of the friction shell proper, the casting provides a cylindrical spring cage 18, and at its rear end the casting A has an integral transverse wall 19 provided with lateral extensions 20—20 adapted to cooperate with the rear stop lugs 12 in the manner of a rear follower. The interior of the friction shell proper 17, which is of generally cylindrical formation, is preferably comprised of four, true, cylindrical surfaces 21—21, symmetrically arranged around the axis, each of approximately 90° extent. The cylindrical surfaces 21—21 are converged inwardly of the shell on a relatively slight taper and in such a manner that the inner ends of said four cylindrical surfaces merge to form a true circle. With this arrangement, the friction shoes, which have true cylindrical surfaces as hereinafter described, will maintain true surface contact as distinguished from line contact with the shell, at all positions during a compression stroke.

The wedge B, through which the pressure is transmitted, is in the form of a hollow casting having a front, transverse, bearing surface 22 adapted to engage the front follower 15. At its inner end said wedge B is provided with two, true, wedge faces 23—23 and two other, rearwardly converged, inclined faces 24—24, all of said faces 23 and 24, as best shown in Figure 4, being disposed around the center or axis of the wedge and giving the same the appearance of a truncated, somewhat irregular, quadrangular pyramid.

The two friction shoes C and D are of like construction, each having an outer friction surface 121 which corresponds to a portion of a true cylindrical surface and which extends through an arc of approximately 90°. On its inner side, that is, the side nearest the axis of the shell, each shoe C and D is provided with a lateral enlargement 25, on the front face of which is provided a rearwardly and inwardly inclined face 123 corresponding in angle to and cooperating with one of the wedge faces 23, as clearly shown in Figures 1 and 3.

The two remaining friction shoes E and F are also of like construction, each being provided with a similar, outer, cylindrical friction surface 121. On its inner side, each friction shoe E and F is also provided with a similar, inwardly projecting, lateral enlargement 25 having a rearwardly and inwardly inclined face 124 corresponding in angle to and coacting with one of the inclined faces 24 of the wedge B. The faces 123 and 124 of the shoes are so disposed that the front ends of the shoes will normally lie approximately flush with each other and at a point outside of the shell.

The spring resistance G, as shown, comprises an outer heavy coil bearing at its inner end against the wall 19 of the casting A and an inner lighter coil bearing at its inner end upon a hollow cup-like boss 26 formed integral with the wall 19.

The spring follower or cap H is more or less cup-shaped, having a heavy annular flange 27 which is adapted to bear on the inner ends of the shoes and on the front end of the outer coil of the spring G. Said spring follower or cap H has a forwardly extended integral cup-shaped section 28, the interior of which provides a bearing for the front end of the inner coil of the spring resistance.

The retainer bolt J is anchored at its rear end within the boss 26 and at its forward end within the hollow wedge B, the latter and the spring follower being suitably apertured to accommodate the shank of the bolt. The bolt not only serves to maintain the parts assembled but is also utilized to place the spring under initial compression to adjust the parts to proper over-all length and to maintain them in this position when under full release.

With the arrangement of wedge and shoes hereinbefore described, it will be observed that each of the keen wedge shoes is diametrically opposite to a blunt angle shoe whereby equalized pressure against the shell at all points circumferentially thereof is assured. Although two blunt and two keen angled shoes are shown in the specific embodiment of the invention herein illustrated, the invention is not limited thereto, for it will be evident that a greater number of shoes may be employed, the primary consideration being that a blunt shoe be diametrically opposed to each keen shoe.

Assuming a buffing or compressing action applied to the draft rigging, the operation is as follows: As the wedge B is forced inwardly of the shell, there will be, initially, a slight movement of the wedge inwardly with reference to the keen angle shoes C and D, due to the inertia of the shoes, and the static friction between said shoes and the shell. On account of the relatively keen angle, slippage of the faces 23 and 123 on each other is possible during this initial action. During this initial action, the two blunt angle shoes E and F will move longitudinally inwardly of the shell substantially in unison with the wedge B on account of the relatively blunt angles of the cooperating faces 24 and 124, thus advancing the shoes E and F longitudinally slightly ahead of the keen angle shoes C and D. During the described initial movement, the desired spreading action will be set up. As the parts continue their movement inwardly of the shell, there will be substantially no further slipping action between the keen angle faces 23 and 123 but, due to the taper of the shell surfaces, there will necessarily be a relative approach of the shoes which is permitted by the shoes E and F moving radially inward with respect to the wedge B, the slippage occuring on the blunt angle faces 24 and 124 which act in the manner of a "safety valve" for this purpose. This differential action further advances the shoes E and F longitudinally slightly ahead of the shoes C and D and the action so continues until the end of the compression stroke. During the compression stroke, as described, and due to the advance of the shoes E and F relatively to the shoes C and D, the spring follower or cap H will be displaced or removed from the inner ends of the shoes C and D. While the spring follower or cap H is out of engagement with the inner ends of the keen shoes C and D during the compression stroke, as hereinbefore described, nevertheless, it will be apparent that the shoes C and D always offer resistance because of the friction between the surfaces 121 thereof and the shell friction surfaces 21, the friction acting to retard the shoes C and D with gradually increasing force during the compression stroke. As the friction shell is of metal, it is capable of a limited amount of radial expansion, which takes place during the compression of the mechanism.

Upon removal of the actuating or compressing force, there is an initial releasing action induced by the radial inward contraction of the shell. The contraction of the shell produces a relative approach toward the center line of the mechanism of all four shoes and this in turn causes the pressure transmitting wedge to be squeezed out from between the shoes, this action being facilitated by reason of the blunt angle faces 24 and 124 on the wedge and blunt shoes respectively, the faces 24 and 124 now acting as true wedge faces with respect to the radial inwardly directed forces. The initial release action just described results in the loosening of the wedge B sufficiently to reduce the pressure between the friction surfaces of the various shoes and shell, whereupon the spring resistance becomes effective to move all of the friction elements outwardly of the shell. At the beginning of the outward movement just referred to, the spring follower or cap G will obviously move the two blunt angle shoes E and F in an outward direction, which in turn pick up the wedge B sufficiently to loosen the keen angle wedge faces 23 and 123 so that immediately thereafter the spring follower or cap will pick up the inner ends of the keen shoes C and D and also move them out longitudinally. The outward movement continues until the wedge B is limited against further movement by the bolt J.

While I have herein shown and described my improvements as employed in a casting of substantially cylindrical form throughout, nevertheless, it will be appreciated by those skilled in the art that the invention may be embodied in gears of other types and also that various changes and modifications may be made in certain details of construction without in any wise departing from the spirit of the invention. All such changes, modifications and variations are contemplated that come within the scope of the claims appended hereto.

I claim:

1. In a friction shock absorbing mechanism, the combination with a friction shell having interior friction surfaces arranged circularly; of a series of friction shoes cooperable with said shell and arranged in a circular series; a spring resistance; and spreader means cooperable with said shoes, said shoes and spreader means having a plurality of cooperating sets of faces, part of which are arranged at a relatively keen wedge acting angle and others at a relatively blunt releasing angle, each shoe having a blunt face being disposed diametrically opposite to a shoe having a keen face.

2. In a friction shock absorbing mechanism, the combination with a friction shell having interior friction surfaces; of diametrically opposed pairs of friction shoes within the shell, each of said shoes being provided with a wedge face, and the wedge face of one shoe of each diametrically opposed pair being keener than the wedge face of the opposed shoe; a spring resistance; and spreader means having a plurality of wedge faces, each face thereof cooperating with the face on one of said shoes.

3. In a friction shock absorbing mechanism, the combination with a cylindrical friction shell having interior friction surfaces converging inwardly of the shell; of a wedge pressure transmitting member provided with a face on one side thereof extending at a relatively keen angle with reference to the longitudinal axis of the mechanism and a face on the diametrically opposite side thereof extending at a relatively blunt angle to said axis; a plurality of friction shoes coacting with the shell friction surfaces, each shoe having a wedge face coacting with one of the faces of the wedge pressure transmitting member; and means yieldingly opposing inward movement of said shoes.

4. In a friction shock absorbing mechanism, the combination with a cylindrical friction shell having interior, circularly arranged friction surfaces; of a spring resistance; a plurality of friction shoes operating within the shell and arranged in a circular series therewithin; a pressure transmitting wedge operating between said shoes, said wedge having diametrically opposed pairs of wedge faces coacting with said shoes, one of each pair being acute and the other blunt with reference to forces applied substantially parallel to the axis of the mechanism.

5. In a friction shock absorbing mechanism, the combination with a friction shell having interior, circularly arranged, friction surfaces; of a spring resistance; a series of four friction shoes slidable within said shell and arranged in a circular series; and a movable wedge acting between said shoes, two of said shoes having inner faces disposed at a keen angle with reference to the axis of the mechanism and coacting with similarly inclined faces on said wedge member, and the remaining shoes having inner faces disposed at a relatively blunt angle to said axis and coacting with similarly inclined faces on said wedge member.

6. In a friction shock absorbing mechanism, the combination with a cylindrical friction shell having interior, rearwardly converging, cylindrical friction surfaces; of a spring resistance; four friction shoes arranged in a circular series, each shoe extending through an arc of approximately 90° in extent, and cooperating with one of the friction surfaces of the shell, two of said shoes each having a keen wedge face and the two remaining shoes each having a face extending at a relatively blunt angle to the axis of the shell; a pressure transmitting wedging means having correspondingly inclined faces cooperating with those of the shoes.

7. In a friction shock absorbing mechanism, the combination with a friction shell having interior rearwardly converging friction surfaces; of a series of friction shoes within the shell cooperating with the friction surfaces thereof; a spring resistance; spreader means cooperable with said shoes, said shoes and spreader means having a plurality of cooperating sets of faces, two sets of which are disposed at relatively blunt angles with reference to the longitudinal axis of the mechanism and the remaining sets of which are disposed at relatively keen angles with reference to the axis of the mechanism.

8. In a friction shock absorbing mechanism, the combination with a friction shell having interior cylindrical friction surfaces; of a spring resistance; wedge pressure transmitting means; and an even number of friction shoes cooperable with said shell cylindric friction surfaces, certain of said shoes and said means having cooperating sets of engaging faces inclined at a relatively acute and wedging angle with respect to forces applied substantially parallel to the axis of the shell, the remaining shoes and said means having cooperating sets of faces inclined to the axis of the mechanism at a blunter angle.

9. In a friction shock absorbing mechanism, the combination with a friction shell having interior cylindrical friction surfaces; of a spring resistance; wedge pressure transmitting means; and an even number of friction shoes cooperable with said shell cylindric friction surfaces, certain of said shoes and said means having cooperating sets of engaging faces inclined at a relatively acute and wedging angle with respect to forces applied substantially parallel to the axis of the shell, the remaining shoes and said means having cooperating sets of faces inclined to the axis of the mechanism at a blunter angle, each of said shoes with a keen angle face being disposed diametrically opposite a shoe with a blunt angle face.

10. In a friction shock absorbing mechanism, the combination with a column load sustaining member, having longitudinally extending friction surfaces converged in the direction of length of said member; of a spring resistance; an even number of friction shoes cooperable with the friction surfaces of said member; and wedge pressure transmitting means cooperable with said shoes, some of said shoes and means having engaging faces inclined at a relatively keen angle with respect to lines of applied force, the remaining shoes and said means having engaging faces inclined at a blunter angle with respect to the lines of applied force.

In witness that I claim the foregoing I have hereunto subscribed my name this 7th day of November, 1923.

JOHN F. O'CONNOR.

Witnesses:
FRANCES SAVAGE,
HARRIETTE M. DEAMER.